(No Model.) 3 Sheets—Sheet 3.
E. G. T. COLLES.
FEED WATER HEATER AND PURIFIER.
No. 523,326. Patented July 24, 1894.
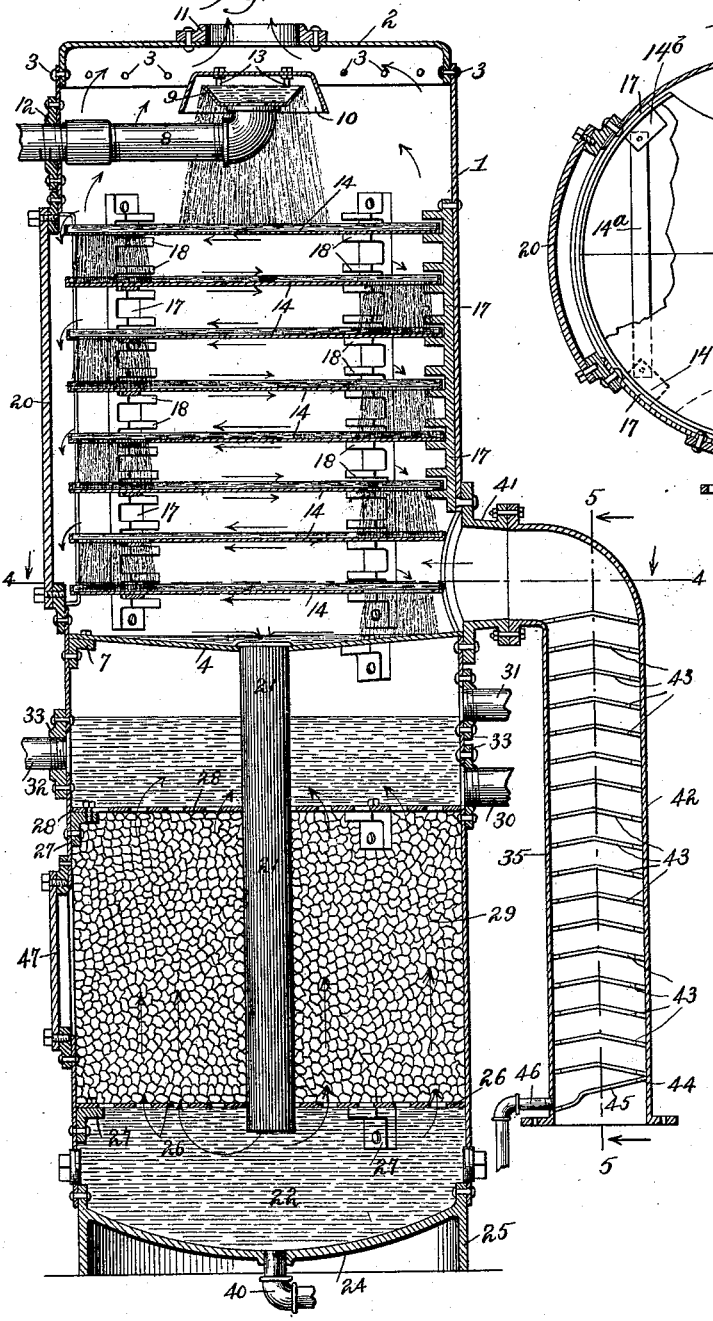

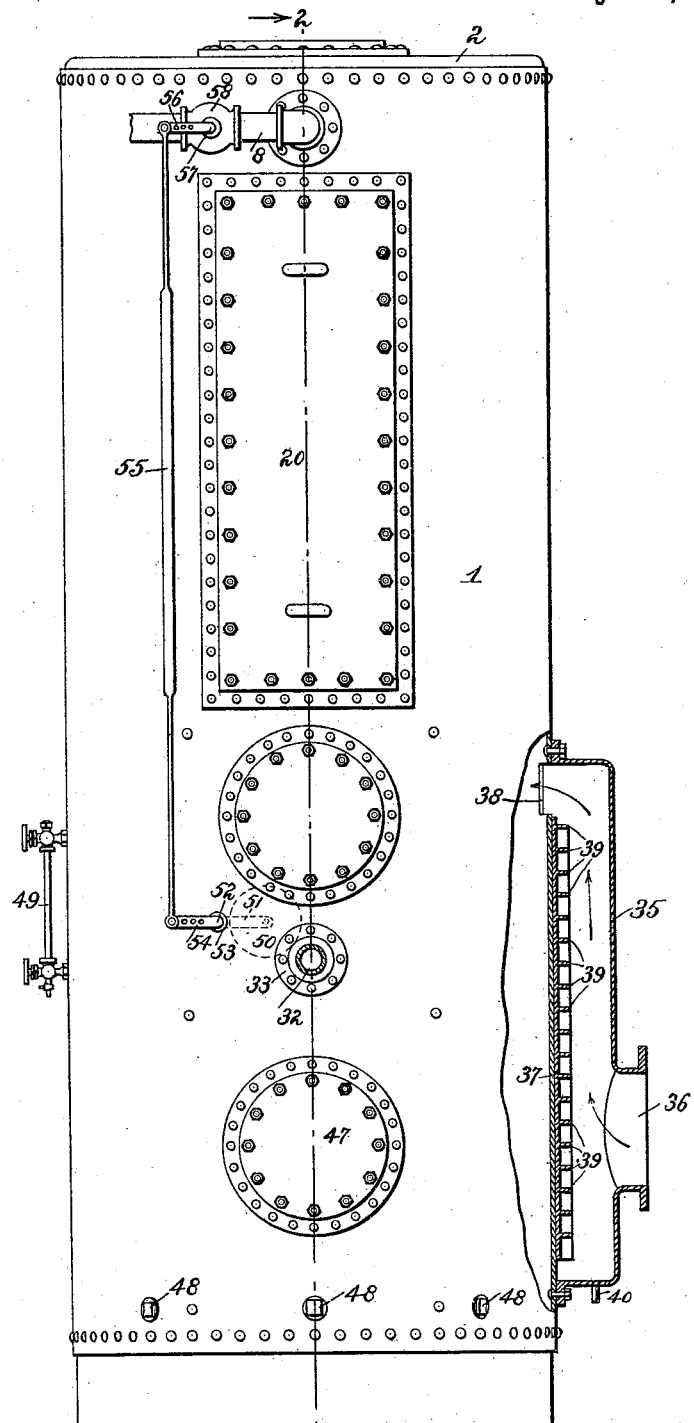

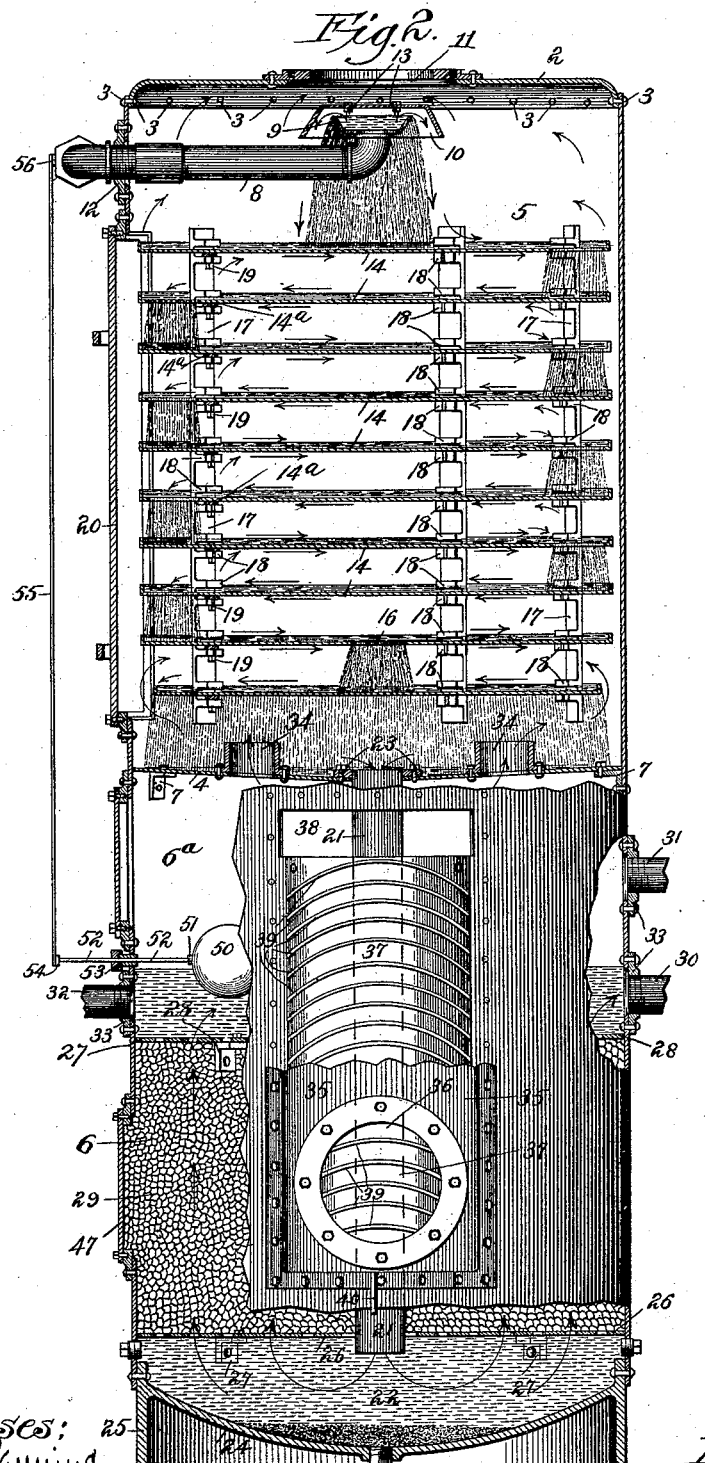

UNITED STATES PATENT OFFICE.

EDWARD G. T. COLLES, OF CHICAGO, ILLINOIS.

FEED-WATER HEATER AND PURIFIER.

SPECIFICATION forming part of Letters Patent No. 523,326, dated July 24, 1894.

Application filed November 14, 1893. Serial No. 490,893. (No model.)

*To all whom it may concern:*

Be it known that I, EDWARD G. T. COLLES, a citizen of the United States, residing at Chicago, in the county of Cook and State of Illinois, have invented certain new and useful Improvements in Feed-Water Heaters and Purifiers, of which the following is a full, clear, and exact description, reference being had to the accompanying drawings, forming a part of this specification.

My invention relates to apparatus for heating the water which is to be fed to steam-boilers and also for purifying such water so as to eliminate therefrom all substances which would be liable to produce incrustation or other injury or detrimental effects upon the boiler; my invention relating more particularly to such apparatus as employ either live or exhaust steam as the water-heating medium.

Among the primary objects of my invention is included that of producing a feed-water heater which shall be rapid and effective in its operation, and in which the largest area of exposure of the water to the steam shall be insured, thus attaining a thorough heating of the feed-water and at the same time an effective precipitation of impurities contained in the water.

A further primary object of my invention is to produce an apparatus which shall effectively eliminate all oil and other impurities from the steam previous to its contact with the feed-water, thus preventing any contamination of the feed-water by the steam.

A still further primary object of my invention is to produce an apparatus by means of which the heated feed-water shall be further purified by a filtering operation; and also to produce an apparatus which shall be simple and compact in its construction and the various principal parts of which shall be readily accessible for inspection, removal and replacement or renewal.

The above mentioned objects, and also such others as may appear from the ensuing description, are attained by the structures shown in the accompanying drawings, in which—

Figure 1 is a view, principally in front elevation, but partly broken away and in transverse vertical section, of a heater and purifier embodying my invention. Fig. 2 is a transverse vertical section of the apparatus, taken on the line 2—2 of Fig. 1; the direction of view being that indicated by the arrows adjacent to the section-line. Fig. 3 is a transverse vertical section of a heater and a modified form of steam-purifier embodying my invention. Fig. 4 is a horizontal section of the apparatus shown in Fig. 2 and taken on the plane indicated by the line 4—4 of said figure; the direction of view being downward as indicated by the arrows adjacent to the section-line. Fig. 5 is a transverse vertical section of the steam-purifier shown in Fig. 3; the purifier being detached from the heater, and the plane of section being at right angles to the plane of section in Fig. 3.

Referring first to the structure shown in Figs. 1 and 2, 1 designates the shell or outer casing of the apparatus, this shell being shown as of cylindrical form, of suitable length and diameter, and as placed lengthwise in a vertical position. The upper end of the shell 1 is provided with a suitable head, such for example as the head 2, said head being secured in any suitable manner to the upper end of the shell. I have shown the outer margin of the head 2 as bent downward so as to fit closely within the upper end of the shell 2 and as securely riveted to the shell, as at 2; this being a desirable but yet not an absolutely essential way of securing the head. The interior of the shell 1 is divided by a horizontal partition or septum 4 into an upper compartment or water-heating chamber 5 and a lower compartment or filtering and settling chamber 6; this partition 4 being supported in any desirable manner, as for example, by brackets 7 riveted or bolted to the inner surface of the shell and supporting the edges of the partition.

Into the upper part of the heating-chamber 5 enters a water-supply pipe 8 which may extend through the upper end of the shell 1 and be threaded through a socket-plate 12 secured to the outer part of the shell, or which may extend through the head 2, as preferred. In any event the inner end of the supply pipe 8 preferably terminates centrally within the upper part of the water-heating chamber 5 and carries a flaring mouth-piece 9 which is shown as being presented upwardly.

An outlet for steam opens from the upper part of the heating-chamber 5, such outlet being shown at 11 as formed through the head 2, and just below said outlet is placed a downwardly flared guard or deflector 10 which is interposed between the mouth-piece 9 and the outlet 11 so as to prevent the water from being carried through the outlet by the outgoing steam. This deflector or guard may be supported either by the mouth-piece 9, through bracket-posts 13 secured to the latter, or by the head 2, through equivalent bolts, or by any other desirable means. The deflector 10 and mouth-piece 9 also serve to spread the water issuing from the supply-pipe 8 so as to insure a more effective distribution of the water upon the pans or trays to be presently described.

Within the water-chamber 5 are placed any suitable number of horizontal trays or water-pans 14, there being nine of such pans or trays shown in the drawings, but this precise number is susceptible of as wide variation as the capacity of any particular apparatus may demand. In any event, these pans are arranged in a vertical series, one above another, and each pan is composed of a plurality of sections; each pan being shown for example in Fig. 4 as composed of two sections, but there may be as many sections in each pan as may be desirable in order to enable the pan to be removed, section by section from the chamber when desired and to be similarly replaced in the chamber.

As shown in Fig. 4, the adjacent or inner margins of the two sections of each pan or tray are straight and lie in direct contact with each other when the tray is in proper operative position, and the opposite or outer margins of said sections are each of approximately semi-circular form, excepting that the outer margin of one section is cut away inwardly, as at 15, so as to form an outlet-opening for the feed-water, as hereinafter more fully explained. In any event, each tray is, as a whole, of less external diameter than the internal diameter of the heating-chamber 5, so as to permit free passage of the steam around the trays, as the steam flows through the heating-chamber. Adjacent to the manhole having the cover 20 are placed a number of horizontal supporting-bars 14$^a$, one for each tray 14 and each resting and secured by bolts 19 at its ends removably upon two brackets 14$^b$ secured to the shell 1 at opposite sides of the manhole-opening. The lower parts of the bracket-arms 18 opposite from these supporting-bars 14$^a$ are thick enough to preserve the level of the pans.

The outlet-openings 15 of the trays 14 are placed alternately adjacent to the opposite sides of the heating-chamber 5, so that the feed-water from the supply-pipe 8 is caused to flow alternately from side to side of the heating-chamber, over the trays 14, until it reaches the tray which is immediately above the lowest tray. The outlet-opening 15 in this second tray is formed by cutting away one or both of the straight inner margins of the tray-sections, so as to permit the feed-water to fall upon the middle of the lowest tray and to fall from the sides thereof upon the partition 4.

The trays are supported in their described positions in the heating-chamber by a suitable number of bracket-pieces 17, each in the form of a single integral casting or piece, and preferably of sufficient length to support the adjacent parts of all of the trays. Each bracket-piece 17 is also formed with inwardly extending bracket-arms 18 corresponding in number to the number of trays, and each arm is bifurcated longitudinally horizontally so as to embrace (above and below) the adjacent edge of one of the trays. Obviously any suitable number of these bracket-pieces 17 may be employed.

By virtue of the described construction and arrangement, the trays are held securely in position, and may nevertheless be readily removed through a door 20 in one side of the heating-chamber 5, for cleansing from sediment of a calcareous, slimy, or other objectionable character; it being only necessary to remove the retaining-bolts 19 and to lift and slide the pan-sections over each other, and then to withdraw such sections through the door 20.

The operation of replacing the tray-sections is obviously simply the reverse of that just indicated.

Into the middle or center of the partition 4 is inserted the upper end of a conduit-pipe 21 which extends downward into a settling-chamber 22 in the lower end of the shell 1, and beneath the filtering-chamber 6. The upper end of this conduit-pipe may be secured in any suitable manner to the partition 4, but for illustration said end of the pipe is shown as closely embraced by a ring 23 which is bolted or riveted to the partition; the arrangement in any event being such that the water from the heating-chamber 5 shall flow downward through the conduit-pipe 21 and into the settling-chamber 22.

The bottom 24 of the settling-chamber is preferably of dished form, and is placed with its concave surface uppermost, and said bottom may be secured in any suitable manner to the lower end of the shell 1. As shown, the outer margin of the bottom is united to a pendent circular supporting-flange 25 which stands upon a floor or a suitable setting and the upper edge of said flange 25 rises above the margin of the bottom-piece and is riveted or bolted to the lower end of the shell 1; the flange 25 thus supporting both the bottom 24 and the shell 1.

At a suitable distance above the bottom 24 of the settling-chamber 22, is placed a horizontal perforated or foraminous plate 26 which constitutes the bottom of the filtering-chamber 6 and which may be supported in any suitable manner in its required position. As shown, the perforated plate 26 is supported upon suitable brackets 27 secured to the inner surface of the shell 1, and in any event a second perforated plate $a^8$ is placed a suitable distance above the plate 26; this second perforated plate constituting the top of the filtering chamber and also the bottom of a reservoir-chamber $6^a$; the top of said reservoir-chamber being formed by the partition 4. The perforated plate 28 may be supported in its required position in any suitable manner, but as shown it rests at its edges upon brackets 27 which are secured to the inner surface of the shell 1. Between the perforated plates 26 and 27 is placed a mass 29 of coke, gravel, or any other suitable granular filtering-material and the feed-water after flowing downward through the conduit-pipe 21 and filling the settling-chamber 22, rises through this mass of filtering-material and accumulates in a perfectly purified condition in the reservoir-chamber $6^a$ between the septum 4 and the upper perforated plate 28.

The purified water is drawn off as required and fed to the boiler or boilers, by a suitable feed-pump (not shown) which draws the water through an outlet-pipe 30 leading from the reservoir-chamber $6^a$ at a point just above the perforated plate 28. An overflow-pipe 31 also leads from the reservoir-chamber $6^a$ at a point above the level of the point of entrance of the outlet-pipe 30, and an inlet-pipe 32, for water of condensation from a steam-heating system, or any other suitable plant is also connected to the reservoir chamber $6^a$, preferably at a point opposite from the outlet-pipe 30; these pipes 30, 31 and 32 being shown, by way of illustration, as each screwed into a socket-plate 33 which is riveted to the shell 1. Obviously, however, these pipes may be connected to the shell in any suitable manner so as to form tight joints. The water of condensation which enters through the inlet-pipe 32 requires no purification, either by filtration or otherwise, and hence such water mingles harmlessly with the water received through the filtering-chamber, and is drawn out with the latter through the outlet-pipe 30 or through the overflow-pipe 31, and is fed to the boiler or boilers.

In order to purify the exhaust steam from an engine, or similar source of exhaust, from oily impurities previous to the use of the steam for heating the feed-water, I employ the attachments which I will now proceed to describe.

35 designates the steam-purifier-casing, shown as of oblong rectangular form and as riveted or bolted to the lower part of the shell 1, at the lower part of one side of said shell. This purifier-casing 35 is closed at its sides and lower end and near said lower end the casing is provided with an inlet 36 for exhaust steam. The upper end of the purifier-casing 35 communicates with the interior of the water-heating chamber 5 through an opening 38 which permits the purified steam to escape from the casing 35 and enter the heating-chamber 5. This purifier-casing 35 surrounds an impact-plate 37 which is located opposite the inlet-opening 36 and the outer surface of which is provided with a plurality of ledges 39 disposed in vertical series one above another. These ledges 39 may be formed upon or connected with the impact-plate 37 in any suitable manner, but as shown they are integral with the outer surface of the plate. As shown in Fig. 2, the ledges 39 are each of segmental form and said ledges extend transversely of the impact-plate; said ledges being of such length as not to extend at their ends fully to the side edges of the impact-plate. The arrangement is such that as soon as the exhaust steam enters through the inlet-opening 36, such steam impinges directly upon the ledged surface of the impact-plate 37. The steam is forced upward to and through the outlet-opening 38, while the oily impurities contained in the steam are intercepted and collected by the ledges 37; only the pure steam escaping through the outlet-opening 38. The oil flows outward along the ledges 37 and drops from the ends thereof into the bottom of the purifier-casing, below the steam-inlet 36, and is drawn or drained from said casing through a drip-pipe 40 which opens from the bottom of the casing.

In Figs. 3 and 5 I have shown a slight modification of the construction of the steam-purifier; the same principles of operation prevailing, however, in both forms of the purifier. In this modified structure, the casing or shell 42 of the steam-purifier is, throughout its body-portion, wholly separate from the shell or casing 1, the purifier-casing being transversely of circular, angular, or any other suitable tubular form, and being shown as placed vertically. The casing 42 may be placed horizontally or upon an incline, if desired, but as shown, the casing is bolted at one end to the shell 1; the connection of this end of the purifier-casing being of any suitable tight form, and being shown for illustration as including a coupling-ring or collar 41 which is riveted to the side of the shell 1, at a point just above the partition 4, of said shell. Within the purifier-casing 42 are located two oppositely disposed series of ledges 43 which are cast, or riveted or otherwise secured to the two opposite inner sides of the casing 42. These ledges are each of approximately V-form, the two arms of each ledge diverging outward and downward from the angular middle portion of the ledge, and ledges of one set or series are placed opposite the spaces between the ledges of the opposite set or series. Moreover, each ledge is of less length than the internal width of the casing 42, so that the oil can flow downwardly from the ends of the ledges and collect in the lower part of the casing, as will be presently explained. In the lower end of the casing 42 is located a transverse annular ledge 44 which is formed with an opening 45 for the inward passage of exhaust steam, and which is inclined laterally toward a drip-pipe 46. The steam in this instance flows through the purifier-casing 42 and enters the heating-chamber 5, and the oily impurities of the steam are intercepted by the ledges 43 and flow oppositely along said ledges to the outer ends thereof, falling from said ends upon the annular ledge 44 and escaping through the drip-pipe 46.

The other features of construction shown in Figs. 3, 4 and 5 are similar to those shown in the preceding figures, and are designated by similar reference-numerals in both instances. In both forms of construction, a blow-off pipe 40 is provided, by means of which such sediment as may accumulate in the settling-chamber 22 may be removed therefrom. Manholes and manhole-covers 47 are also provided for permitting access to the material in the filtering-chamber 29, and also for affording access to the reservoir-chamber 6ᵃ. A water-gage 49 is also shown as provided for indicating the quantity of water in said reservoir-chamber.

In order to automatically control the amount of water in the reservoir chamber 6ᵃ, I provide a float 50 which is buoyed by the water in said chamber or in a separate communicating space provided for that purpose, so as to rise and fall, respectively, as the amount of water increases or diminishes. This float may be either of the spherical form shown or of any other suitable form and is carried by the free end of a rock-arm 51 the opposite end of which is rigidly secured to the inner end of a rock-shaft 52. This rock-shaft 52 extends horizontally through a suitable stuffing-box 53 inserted into one side of the lower part of the shell 1, and to the outer end of said rock-shaft is rigidly connected one end of a rock-arm 54. To the free end of this rock-arm 54 is connected the lower end of a rod 55 the upper end of which is connected to the free end of a rock-arm 56; the opposite end of said rock-arm being rigidly connected to the outer end of the spindle 57 of a valve 58 in the water-supply pipe 8. The arrangement is such that when the float 50 rises above a certain point it will act through the rock-arms 51, 54, and 56, and rock-shaft 52, rod 55 and spindle 57 to close the valve 58, and when the float descends below a certain point it will act through the said connections and open the valve 58. Thus the water is cut off and let on in the supply-pipe 8 automatically, so as to preserve a practically uniform quantity of water in the space between the partition 4 and the perforated plate 28. In instances where the feed-water is sufficiently pure to avoid any necessity of filtering it, the filter may obviously be dispensed with.

Having thus described my invention, what I claim as new therein, and desire to secure by Letters Patent, is—

1. A feed-water heater, comprising a vertical shell or casing, a plurality of vertical bracket-pieces secured within the heating-chamber and having each a plurality of horizontally bifurcated inwardly extending bracket-arms, and a plurality of inclined horizontal water pans or trays arranged within the heating-chamber and having their edges embraced by the bifurcated bracket-arms, substantially as set forth.

2. A feed-water heater, comprising a vertical shell or casing, a plurality of vertical bracket-pieces secured within a heating-chamber in said shell, and provided with inwardly extending bracket-arms, and a plurality of inclined horizontal water pans or trays arranged within said chamber and each composed of a plurality of sections one of which is cut away marginally to form a discharge-opening, substantially as set forth.

3. A feed-water heater, comprising a vertical shell or casing, a plurality of vertical bracket-pieces secured within a heating-chamber in said shell and provided with inwardly extending bracket-arms, and a plurality of inclined horizontal water pans or trays arranged within said chamber and each of less diameter than the chamber; each of said trays being cut away marginally to form a discharge-opening, substantially as set forth.

4. A feed-water heater, comprising a shell or casing containing a plurality of horizontal water pans or trays placed one above another in a heating-chamber in said shell, a steam-outlet at one end of the shell, a steam-inlet opening into said chamber, a water-supply pipe opening into the upper part of the chamber and provided with a discharge, and a downwardly and outwardly flared guard or shield interposed between the steam-outlet and the water supply discharge, substantially as set forth.

5. A feed-water heater and purifier, comprising a shell or casing containing a heating-chamber, and a settling-chamber, a water inlet opening into the heating-chamber, and a conduit pipe located between the water-inlet and the settling-chamber, a plurality of water pans arranged within said heating-chamber, each of said pans being of less diameter than the chamber, and each pan being cut away marginally to form a discharge-opening, all substantially as set forth and described.

6. In a feed-water heater and purifier, having a steam inlet and outlet, comprising a shell or casing, a plurality of vertical bracket-pieces secured within a heating chamber in said shell, a plurality of water pans arranged within said heating-chamber and supported by said bracket-pieces, each of said pans being of less diameter than the said chamber and each pan being cut away marginally to form a discharge-opening, all substantially as set forth and described.

EDWARD G. T. COLLES.

Witnesses:
JNO. L. CONDRON,
O. R. BARNETT.